Nov. 26, 1968    A. F. ANDERSON    3,412,683
HYDRAULIC SYSTEM CONTROL
Filed Aug. 25, 1966    2 Sheets-Sheet 2
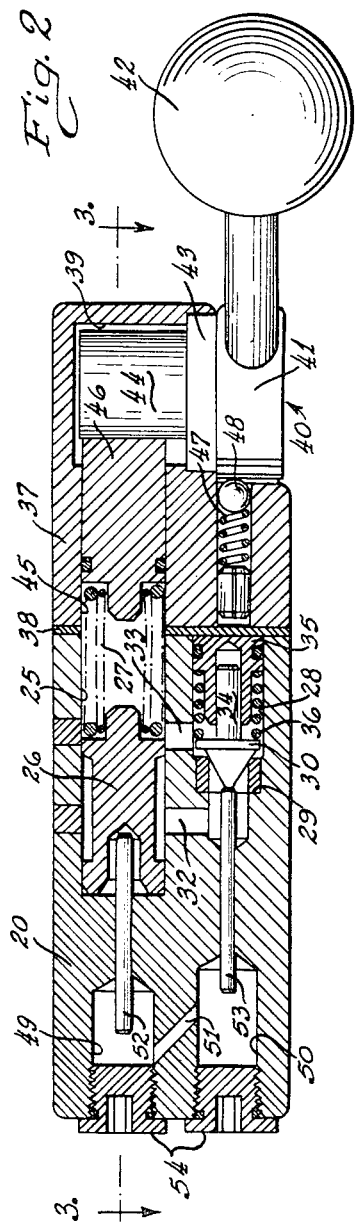
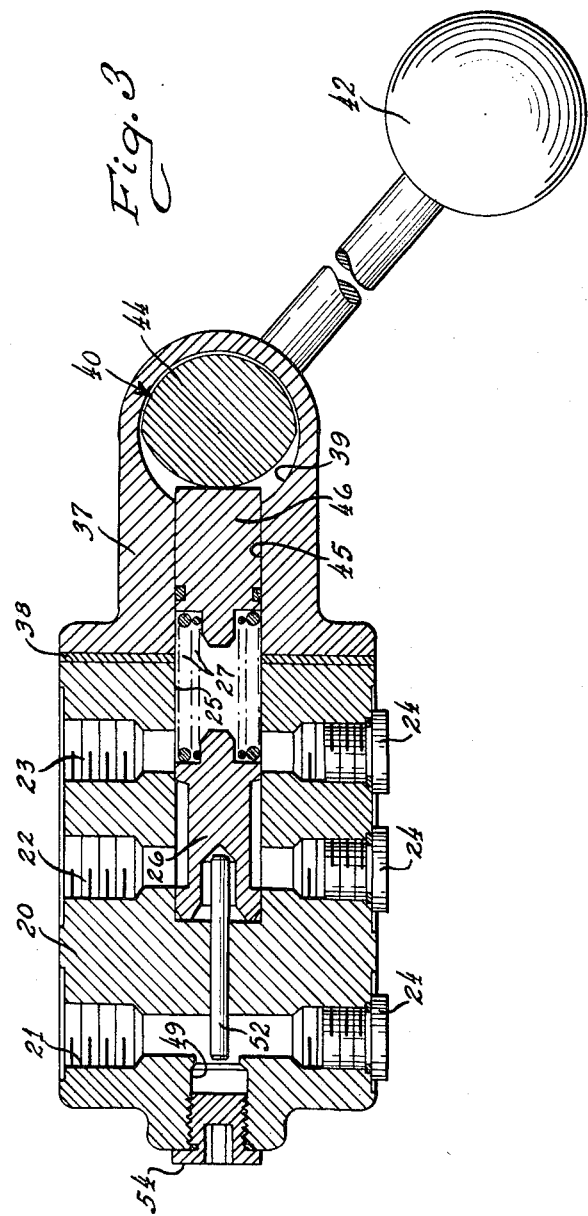
Inventor
ARTHUR F. ANDERSON
By
Gary, Parker, Juettner & Cullinan
Attys United States Patent Office 3,412,683
Patented Nov. 26, 1968

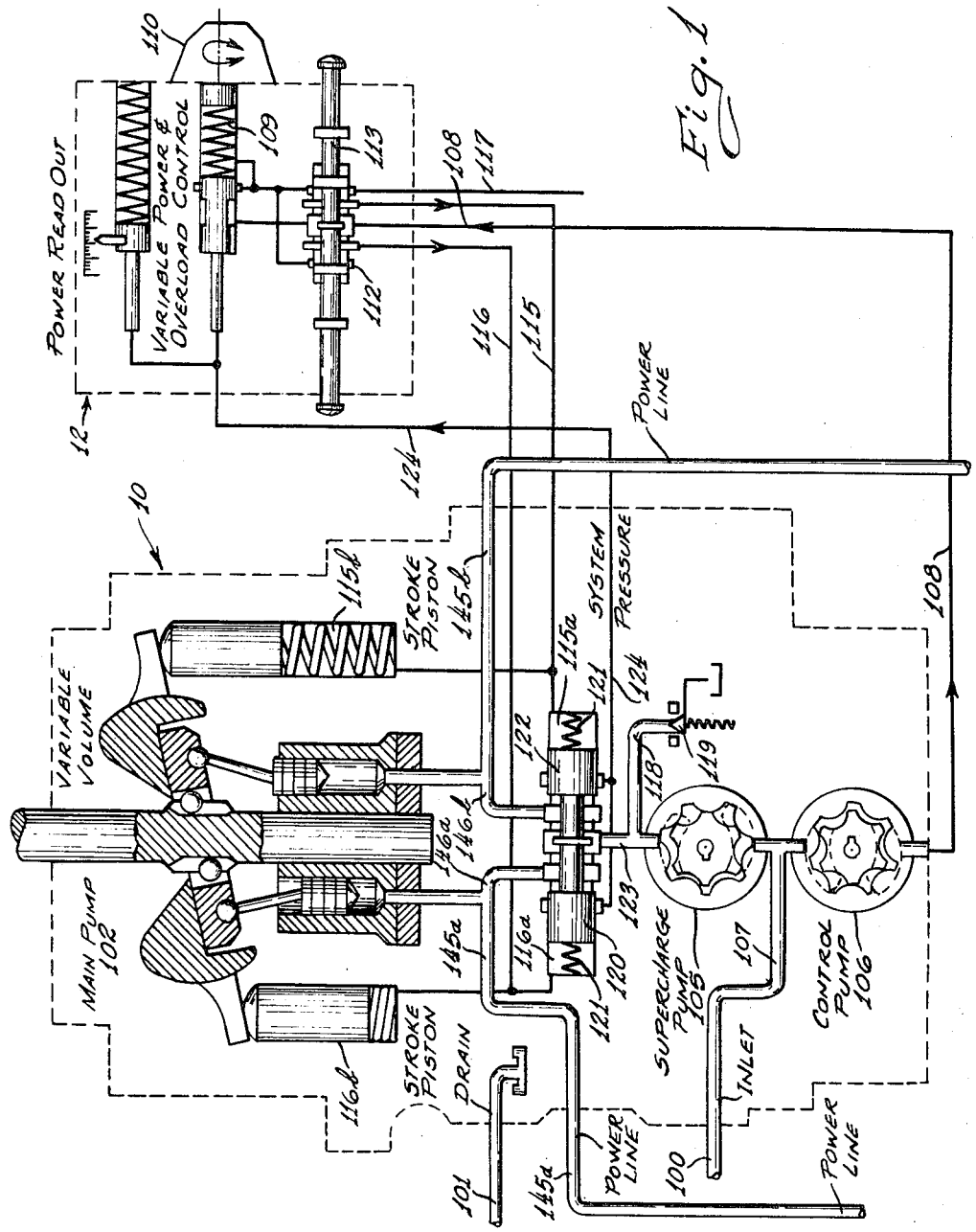

3,412,683
HYDRAULIC SYSTEM CONTROL
Arthur F. Anderson, Elmhurst, Ill., assignor, by mesne assignments, to Ulrich Manufacturing Co., Roanoke, Ill., a corporation of Delaware
Filed Aug. 25, 1966, Ser. No. 575,015
9 Claims. (Cl. 103—38)

ABSTRACT OF THE DISCLOSURE

Control means for hydraulic circuits including system pressure circuit means and control pressure circuit means, comprising a body having a system pressure inlet, a control pressure inlet and a vent outlet, a pair of valves in the body controlling communication between the control pressure inlet and the outlet, both valves being biased to a normal position sealing the control pressure inlet from the outlet, one of the valves being operable by system pressure when system pressure exceeds a first value, the other valve comprising a safety valve and being operated by system pressure when system pressure exceeds a second value and by control pressure when control pressure exceeds a predetermined value; both valves venting the control circuit rather than the system circuit.

---

The present invention relates to automatic control means for hydraulic systems, particularly means for automatically controlling the pressure and/or volume of fluid flow.

The object of the present invention is provision of improved hydraulic system control means especially for controlling the pressure and volume of fluid flow from a variable displacement piston pump.

The objects and advantages of the invention will become apparent in the following detailed description.

In order to acquaint those skilled in the art with the manner of making and using my improved control means, I shall describe, in connection with the accompanying drawings, the best mode presently contemplated by me for carrying out the invention.

In the drawings:

FIGURE 1 is a schematic diagram of a pump and the control means of the present invention;

FIGURE 2 is a vertical longitudinal section of the control means, the view being taken substantially on line 2—2 of FIGURE 3; and FIGURE 3 is a horizontal longitudinal section taken substantially on line 3—3 of FIGURE 2.

Referring first to FIGURE 1, I have depicted, schematically and diagrammatically, a variable displacement piston pump and a preferred embodiment of my control means therefor. The pump is indicated generally at 10 and the controller or regulator at 12; the main or hydraulic power system of the pump is depicted by pipes and/or passages, and the control circuit or system is indicated by relatively fine lines. The fluid supply for the entire system is maintained by a reservoir or the like (not shown) communicating with the remainder of the system by supply and drain lines 100 and 101 respectively.

The reservoir primarily supplies fluid to a main pump 102 which is driven by any suitable prime mover. In the illustrated pump, a super-charger pump 105 and a control pump 106 are embodied in the structure 10 and are driven by the same prime mover as pump 102.

The control pump 106 draws fluid from the reservoir supply line 100 via passage 107 and pumps the same at a relatively low control pressure (e.g. 400 p.s.i.) via conduit 108 to a pressure regulator 109. The regulator 109 is manually adjustable, as by means of a handle or knob 110, thereby to cause increase or decrease in the control pressure and by virtue thereof to increase and decrease the main pump output, as will presently be described. The fluid at the regulated control pressure flows to a four-way reversing valve 112 including a reciprocable spool 113 having a central neutral position, a forward position and a reverse position. In the neutral position, the valve ports are interconnected by the valve body and spool whereby the entire control system is at the same pressure and thus neutralized. In the forward position, the spool serves to connect line 108 to a forward control line 115 and a reverse control line 116 with a relief line 117 which may return to the reservoir. In its reverse position, the spool 113 reverses the connections effected in the forward position, i.e., connecting the line 108 to the reverse control line 116 and connecting the forward control line 115 to the relief line 117.

The valve 112 may be operated manually, and is operable independently of the pressure regulator 109. Assuming the valve 112 is in forward position, control fluid at a regulated or adjusted pressure is fed via line 108 to the forward control line 115. At the same time, the line 116 is vented. Fluid in line 115 is fed to a hydraulic actuator 115a for a four-way valve 120 and to a main pump direction controlling an output adjusting stroke cylinder 115b. The cylinder 115b operates to cause the main pump 102 to operate in one direction, i.e., to pump fluid in one direction, and also operates upon increase and decrease in the control pressure to increase and decrease the output of the pump 102.

The valve 120 includes a spool 122 centered in a neutral position by centering springs 121, and the same in said position includes ports interconnecting and serving to put the system all at the same pressure thereby to neutralize the system. Upon actuation by the actuator 115a, the spool 122 is shifted to a forward position, which in the illustration is to the left of the neutral position depicted. Due to simultaneous actuation of the stroke cylinder 115b, the pump will in this position of the valve be operating to supply fluid under pressure via power line conduit 145a to one or more reversible hydrostatic motors or a like load (not shown) to operate the same. At the same time, hydraulic fluid is returned from the motors or the like via conduit 145b which at this time is connected to the pump inlet, whereby fluid is circulated in essentially a closed loop from the pump 102 via line 145a to the load and then back to the pump via line 145b.

The conduit 145a is also coupled to a conduit 146a which leads back to the valve 120 and which at this time is coupled via the valve to a conduit 124 which leads to the pressure regulator 109, whereby full system pressure is brought to bear on the regulator to the extent that if system pressure exceeds a predetermined maximum the regulator will be opened or by-passed or vented to relieve or decrease control pressure, whereby the stroke cylinder 115b will be automatically adjusted to decrease the output of the main pump 102 and thereby afford an automatic safety against excessive system pressures.

The conduit 145b is similarly coupled to a conduit 146b which leads to the valve 120 and which at this time (forward position) is coupled by the valve to the outlet 123 of the super-charger 105 to afford an initially pressurized supply of fluid to the main pump 102. The output pressure of the super-charger is maintained at a suitable level (e.g., 50 p.s.i.) via a by-pass 118 and a relief valve 119 coupled to a drain.

When it is desired to reverse the direction of the power fluid, it is only necessary to operate the reversing valve 112 to its reverse position, whereupon control fluid is supplied via reverse line 116 to a hydraulic actuator 116a for the valve 120 and a second pump direction and stroke adjusting cylinder 116b. At the same time, the actuator 115a and cylinder 115b are vented via line 117, whereupon the actuator 116a may shift the valve 120 to reverse position and the cylinder 116b may take over control of the main pump. Fluid under pressure is then supplied from pump 102 via conduit 145b to the load, the fluid being returned to the pump via conduit 145a. At the same time, the valve 120 has been shifted so that system pressure is transmitted to the regulator 109 via conduit 146b, the valve 120 and the conduit 124; and the conduit 146b is connected to the supercharger 105.

The main pump 102 is thus operable under the control of the pumps 105 and 106, the valve 120 and the controller or regulator 12, whereby to supply fluid under regulated pressure, in varying amounts and in opposite directions to any suitable load, such as one or more hydrostatic motors. For a more detailed disclosure of the pump, reference is made to my copending application Ser. No. 539,973, filed Apr. 4, 1966.

Referring now to FIGURES 2 and 3, the preferred embodiment of my control means is shown as comprising a valve body 20 having an inlet 21 for connection with the system pressure line 124, an inlet 22 for connection with the control pump pressure line 108, and an outlet 23 for connection with a relief or relatively low pressure line such as the line 117. Alternatively, the outlet 23 could be coupled to the super charger by-pass 118 and via the relief valve 119 to a drain or vent. Consequently, inlet 21 is at high pressure (e.g. 5,000 p.s.i.), inlet 22 at moderate pressure (e.g. 100 to 500 p.s.i.) and outlet 23 at low pressure (e.g. 0 to 50 p.s.i.). Preferably, all three of the ports 21, 22 and 23 comprise horizontal cross bores extending entirely through the body 20, whereby connection may be made at either end of each port, with the opposite ends being closed by removable plugs 24

Within the horizontal plane of the ports or cross bores 21, 22 and 23, the body is provided with a longitudinal bore 25 intersecting the inlet 22 and outlet 23. Slidably mounted within this bore is a spool-type relief valve 26 having lands adjacent its ends sealing within the bore and having a circumferential recess between said lands of a length to span between the ports 22 and 23. Normally, the spool valve is biased by one or more springs 27 and/or by the fluid pressure at port 23 into the illustrated position wherein the valve seals the inlet 22 from the outlet 23.

Immediately beneath the bore 25, the body 20 is provided with a second and generally coextensive longitudinal bore 28, which spans ports 22 and 23 and receives therein a poppet valve seat 29 and valve member 30. Vertical passages 32 and 33 are provided between the bores 25 and 28 to establish communication with the ports 22 and 23 respectively, and the poppet valve 30 is disposed intermediate said passages. The poppet valve 30 includes a stem 34 which is slidably received within a sealing member 35 mounted in the bore 28, and a spring 36 is confined between the valve and said member for normally biasing the valve onto its seat.

Detachably mounted on the body 20 at the open end of the bores 25 and 28 is a cam casing 37; a sealing gasket 38 being provided between the body and casing. The casing includes a vertical recess or opening 39 receiving therein a rotatable cam 40. The cam suitably comprises a base 41 to which a handle 42 is secured, a journal portion 43 rotatably mounted in the cam opening 39, and an eccentric cam portion 44 aligned with the bore 25 in the body 20. The casing is also provided with a horizontal bore 45 aligned with and constituting an axial extension of the bore 25. Slidably mounted in said bore is a cam follower 45 juxtaposed to the spool valve 26, the follower bearing on the valve biasing spring or springs 27. Preferably, the facing ends of the valve and follower are provided with reduced axial extensions for reception and guidance of said springs. In use, rotation of the cam 40 will cause the eccentric portion 44 to move the follower 46 in and out thereby to variably compress the springs 27 and cause a variable biasing force to be applied to the spool valve 26.

In the lower regions thereof, the casing 37 is provided with a bore 47 aligned with the base 41 of the cam, and a spring pressed ball type detent 48 is mounted in said bore to engage with a serrated wall portion of the base 41, thereby to releasably retain the cam in any selected position to which it may be rotated.

At its opposite end, the body 20 is provided with two horizontal longitudinal bores 49 and 50 aligned respectively with bores 25 and 28. The bore 49 intersects the cross-bore 21 and a passage 51 between the bores 49 and 50 places the latter bore in communication with the bore 21. A small axial passage is extended between each pair of the aligned bores 25–49 and 28–50, and relatively small pins 52 and 53, respectively, are slidably mounted in said passages. The pins and their passages are preferably lapped, so as to insure a seal therebetween isolating the port 21 from the bores 25 and 28. After the pins have been mounted in the body, the bores 49 and 50 may be closed by plugs 54.

In use, fluid at high pressure is supplied to the port 21 and is brought to bear on the ends of pins 52 and 53, whereby the pins are forced or biased against the valves 26 and 30, respectively. Manifestly, each pin presents a small area, whereby to govern the force applied to the valves, or more properly to achieve an area-pressure force balance relative to the biasing means 27 and 36 of the two valves.

The cam 40 is operable to vary the spring biasing force applied to the valve 26, thereby to vary the pressure level at which system pressure applied to the end of the pin 52 will become effective to move the spool valve 26. When system pressure exceeds such level, the pin 52 is moved inwardly (to the right) thereby moving the spool valve into a position where the recess therein spans the ports 22 and 23 so that the control pump pressure is relieved or reduced by being effectively vented to the low pressure system connected with outlet 23. This causes reduction in control pressure, whereby the pump stroke piston 115b or 116b then acting is relieved thereby to decrease the output of the pump. This in turn relieves the pressure in port 21 and on the pin 52 until the force of springs 27 exceeds the force applied via pin 52, whereupon the valve 26 is shifted back to the left to discontinue venting or relief of control pressure. In the preferred embodiment described herein, the cam 40 and springs 27 are preferably so constructed and arranged as to permit a variation of from about 75 to about 500 p.s.i. in control pressure, whereby to afford an extremely wide range of pump operating characteristics.

At the same time, the valve 30 serves as a maximum pressure control or safety valve for the entire system. Specifically, the valve biasing spring 36 may be so selected relative to both the area-pressure force applications of the pin 53 under system pressure, and the area-pressure force applications of control pressure acting on the portion of the valve 30 normally exposed to the passage 32, as to be opened when the system pressure exceeds a predetermined maximum, or when the control pressure exceeds a predetermined but different maximum, or when the combination of the two exceeds a predetermined value. By appropriate selection of the area of the pin 53, the normally exposed area of the valve 30, and the spring 36, the valve 30 may be designed to open at any time that system pressure exceeds a predetermined maximum, say 5,000 p.s.i., and at any time that control pressure exceeds a predetermined value, say 500 p.s.i. As soon as the valve is initially opened, an even greater area thereof is exposed to control pressure, thereby to force the valve wide open and provide for rapid relief of the dangerous over pressure condition.

Thus, the present invention provides a compact, economical valve unit affording maximum control over hydraulic circuits, and also serving as a system safety valve. These functions are attained whether the circuit is fed by one pump as shown herein, or by a plurality of pumps. Also, those skilled in the art will appreciate uses to which the valve unit may be put in environments other than that specifically illustrated herein.

Accordingly, while I have shown and described what I regard to be the preferred embodiment of my invention, it is to be appreciated that various changes, rearrangements and modifications may be made therein without departing from the scope of the invention, as defined by the appended claims.

I claim:

1. Control means for hydraulic circuits including high-pressure system circuit means, moderate pressure control circuit means and low pressure vent means, comprising a body having a system pressure inlet, a control pressure inlet and a vent outlet, a valve movably mounted in said body, said valve including means sealing said control pressure inlet from said outlet in one position thereof and establishing communication between said control pressure inlet and said outlet in a second position thereof, means normally biasing said valve to said one position, said valve having an end portion of predetermined area facing oppositely of said biasing means exposed to said control pressure inlet whereby said valve will be moved to said second position when control pressure exceeds a first predetermined value, and pin means of a cross-sectional area less than that of said end portion movably mounted in said body having one end exposed to said system pressure inlet and extending to said valve oppositely of said biasing means for moving said valve to said second position when system pressure exceeds a second predetermined value.

2. Control means for hydraulic systems having variable displacement hydraulic pump means including a main high pressure pump having an outlet, a main pump displacement controlling piston means, a moderate pressure control pump having an outlet connected to said piston means, and a low pressure vent, comprising a body having a system pressure inlet connected to the outlet of said main pump, a control pressure inlet connected to the outlet of said control pump, and a vent outlet connected to said vent, a valve movably mounted in said body, said valve including means sealing said control pressure inlet from said vent outlet in one position thereof and establishing communication between said control pressure inlet and said vent outlet in a second position thereof, means normally biasing said valve to said one position, and pin means movably mounted in said body having one end exposed to said system pressure inlet and extending to said valve oppositely of said biasing means for moving said valve to said second position when system pressure exceeds a predetermined value, whereby said control pump outlet and said piston means are vented upon occurrence of excessive system pressure to reduce the displacement of said main pump.

3. Control means for hydraulic circuits including system pressure circuit means and control pressure circuit means, comprising a body having a system pressure inlet, a control pressure inlet and an outlet, means in said body establishing a pair of independent paths between said control pressure inlet and said outlet, a valve in each of said paths, each of said valves being mounted in said body for movement from a first position sealing said control pressure inlet from said outlet to a second position establishing communication between said control pressure inlet and said outlet, first and second means normally biasing respective ones of said valves to their said first positions, and a pair of pin means movably mounted in said body in alignment respectively with said valves oppositely from said biasing means, each pin means having its end exposed to said system pressure inlet and being adapted to move the respective valve to its said second position by virtue of excessive pressures in said system pressure inlet, one of said valves comprising an operating control valve and the biasing means therefor being set to accommodate movement of said one valve when the system pressure exceeds a first value, the other of said valves comprising a safety valve and the biasing means therefor being set to accommodate movement of said other valve when the system pressure exceeds a second value.

4. Control means as set forth in claim 3, said other valve opening in the direction of said outlet, closing in the direction of said control pressure inlet and having a portion thereof exposed to said control pressure inlet, whereby said other valve may be moved to its said second position upon occurrence of excessive pressures of said second value at said system pressure inlet or occurrence of excessive pressure of a different value at said control pressure inlet.

5. Control means as set forth in claim 3, said biasing means for said one valve being adjustable to vary said first value of system pressure at which said one valve is moved.

6. Control means for hydraulic circuits including system pressure circuit means and control pressure circuit means, comprising a valve body having three transverse bores constituting a system pressure inlet, a control pressure inlet and an outlet respectively, a first longitudinal bore in said body connecting said control pressure inlet and said outlet, a spool valve in said first longitudinal bore movable from a first position sealing said control pressure inlet from said outlet to a second position establishing communication between said control pressure inlet and said outlet, means normally biasing said spool valve to said first position, a second longitudinal bore and passage means in said body establishing a by-pass around said first valve between said control pressure inlet and said outlet, a poppet valve in said second horizontal bore seating in the direction of said control pressure inlet and movable from a seated position wherein it seals said control pressure inlet from said outlet to an open position wherein it accommodates communication between said control pressure inlet and said outlet, means normally biasing said poppet valve to its seated position, a pin extending from each of said valves oppositely of said biasing means and each having its end exposed to said system pressure inlet, and means mounted on said body in operative association with the biasing means for said spool valve for varying the biasing force on said spool valve.

7. Control means as set forth in claim 2, including means for varying the force applied to said valve by said biasing means whereby to vary the system pressure value at which the valve is moved.

8. Control means as set forth in claim 7, said force varying means being under the manual control of an operator during operation of the hydraulic circuits.

9. Control means as set forth in claim 5, including means operable under the manual control of an operator for adjusting the biasing means for said one valve during operation of the hydraulic circuits.

References Cited

UNITED STATES PATENTS

| | | | |
|---|---|---|---|
| 2,410,375 | 10/1946 | Wright | 251—635 |
| 2,945,449 | 7/1960 | Le Febvre et al. | 103—162 |
| 2,977,979 | 4/1961 | Hasbany | 251—634 |
| 3,161,137 | 12/1964 | Thoma et al. | 103—162 |
| 3,234,889 | 2/1966 | Cooper et al. | 103—38 X |
| 3,236,049 | 2/1966 | Reinke. | |
| 3,251,304 | 5/1966 | Knight | 103—37 |
| 3,302,585 | 2/1967 | Adam et al. | 103—162 |

WILLIAM L. FREEH, *Primary Examiner.*